(12) United States Patent
Ash et al.

(10) Patent No.: US 7,243,190 B2
(45) Date of Patent: Jul. 10, 2007

(54) APPARATUS AND METHOD TO REBUILD AN NVS IMAGE USING CACHE DATA

(75) Inventors: Kevin J. Ash, Tucson, AZ (US); David F. Mannenbach, Tucson, AZ (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 10/779,206

(22) Filed: Feb. 13, 2004

(65) Prior Publication Data

US 2005/0193242 A1    Sep. 1, 2005

(51) Int. Cl.
*G06F 11/00* (2006.01)

(52) U.S. Cl. .......................................... 711/113; 714/8
(58) Field of Classification Search .................... 714/8; 711/113

See application file for complete search history.

(56) References Cited

U.S. PATENT DOCUMENTS

| | | | | |
|---|---|---|---|---|
| 5,724,542 A | * | 3/1998 | Taroda et al. ................ | 711/113 |
| 5,742,789 A | * | 4/1998 | Ofer et al. ................... | 711/111 |
| 6,006,342 A | * | 12/1999 | Beardsley et al. ............. | 714/5 |
| 6,061,750 A | * | 5/2000 | Beardsley et al. ............. | 710/74 |
| 6,158,017 A | | 12/2000 | Han et al. ........................ | 714/6 |
| 6,438,661 B1 | * | 8/2002 | Beardsley et al. ........... | 711/144 |
| 6,513,097 B1 | * | 1/2003 | Beardsley et al. ........... | 711/113 |
| 6,516,425 B1 | | 2/2003 | Belhadj et al. ................ | 714/6 |
| 6,658,542 B2 | * | 12/2003 | Beardsley et al. ........... | 711/162 |
| 2003/0233613 A1 | * | 12/2003 | Ash et al. .................... | 714/799 |

* cited by examiner

*Primary Examiner*—Pierre Bataille
*Assistant Examiner*—Sheng-Jen Tsai
(74) *Attorney, Agent, or Firm*—Chandler & Udall, LLP; Dale F. Regelman

(57) ABSTRACT

A method to rebuild an NVS image is disclosed. The method provides information to a first cluster of an information storage and retrieval system, and writes that information to a non-volatile storage device disposed in a second cluster. Upon losing utility power to all or part of the information storage and retrieval system, the method provides back-up power to a processor and a data cache, and determines if the information written to the second non-volatile storage device is accessible. If the information written to the second non-volatile storage device is accessible, then the method copies the image of that second non-volatile storage device to an external storage device. If the information written to said second non-volatile storage device is not accessible, then the method creates a virtual NVS image using the information disposed in a local data cache, and copies that virtual NVS image to an external storage device.

36 Claims, 4 Drawing Sheets

APPARATUS AND METHOD TO REBUILD AN NVS IMAGE USING CACHE DATA

FIELD OF THE INVENTION

The invention relates to an apparatus and method to rebuild an NVS image using local cache data.

BACKGROUND OF THE INVENTION

Information storage and retrieval systems are used to store information provided by one or more host computer systems. Such information storage and retrieval systems receive requests to write information to one or more information storage devices, and requests to retrieve information from those one or more information storage devices.

Certain information storage and retrieval system include two or more clusters, where each cluster includes one or more processors, one or more data caches, and one or more non-volatile storage devices. Upon receipt of a write request, the system writes information received from a host computer to a local data cache, i.e. a data cache disposed in the receiving cluster, and to a "remote" non-volatile storage device, i.e. an NVS disposed in a different cluster.

In the event one cluster fails, the information recently received by that cluster can still be accessed from the remote NVS. In the event both clusters fail in a two cluster system, however, the information written to both caches and both NVSs becomes unavailable. What is needed is a method to rebuild and copy an NVS image in the event, for example, both clusters lose utility power.

Applicants' apparatus provides backup power to each local processor and cache for a limited period of time. During this backup power time interval, Applicants' method rebuilds the remote NVS image using information previously written to the local cache. That virtual NVS image along with the local NVS image is then downloaded to an external storage device for later use.

SUMMARY OF THE INVENTION

Applicants' invention includes an apparatus and method to rebuild an NVS image using cache data upon loss of utility power to Applicants' information storage and retrieval system, where that information storage and retrieval system is capable of communicating with one or more host computers, and where that information storage and retrieval system includes two or more fire hose dump disks and two or more clusters, where each of those two or more clusters comprises a processor, a data cache, a non-volatile storage device, and a backup power source for the local processor and the local data cache, and where a different one of the two or more fire hose dump disks is interconnected to each of the two or more data caches.

A first one of said two or more clusters in Applicants' information storage and retrieval system receives information from a host computer, where that first cluster includes a first processor, a first data cache, a first non-volatile storage device, and a first backup power source. The method then writes that information to the first data cache and to a second non-volatile storage device, i.e. a remote NVS, disposed in a different cluster. Upon losing utility power to all or part of the information storage and retrieval system, Applicants' method provides back-up power to the first processor and the first data cache, and determines if the information written to the remote NVS is accessible.

If Applicants' method determines that information written to the remote NVS is accessible by the first controller, then the method copies the image of that remote NVS along with the local NVS image to a fire hose dump disk interconnected to the first data cache. On the other hand, if Applicants' method determines that the information written to the remote NVS is not accessible by the first controller, then the method creates a virtual NVS image using the information written to the local data cache, and copies that virtual NVS image along with the local NVS image to the fire hose dump disk interconnected to the first data cache.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures. The invention will be described as embodied in a data storage and retrieval system comprising two clusters. The following description of Applicant's apparatus and method is not meant, however, to limit Applicant's invention to systems which include two clusters. Rather, Applicants' method can be used with system which include a single cluster, or with systems which include more than two clusters.

Figure 1:
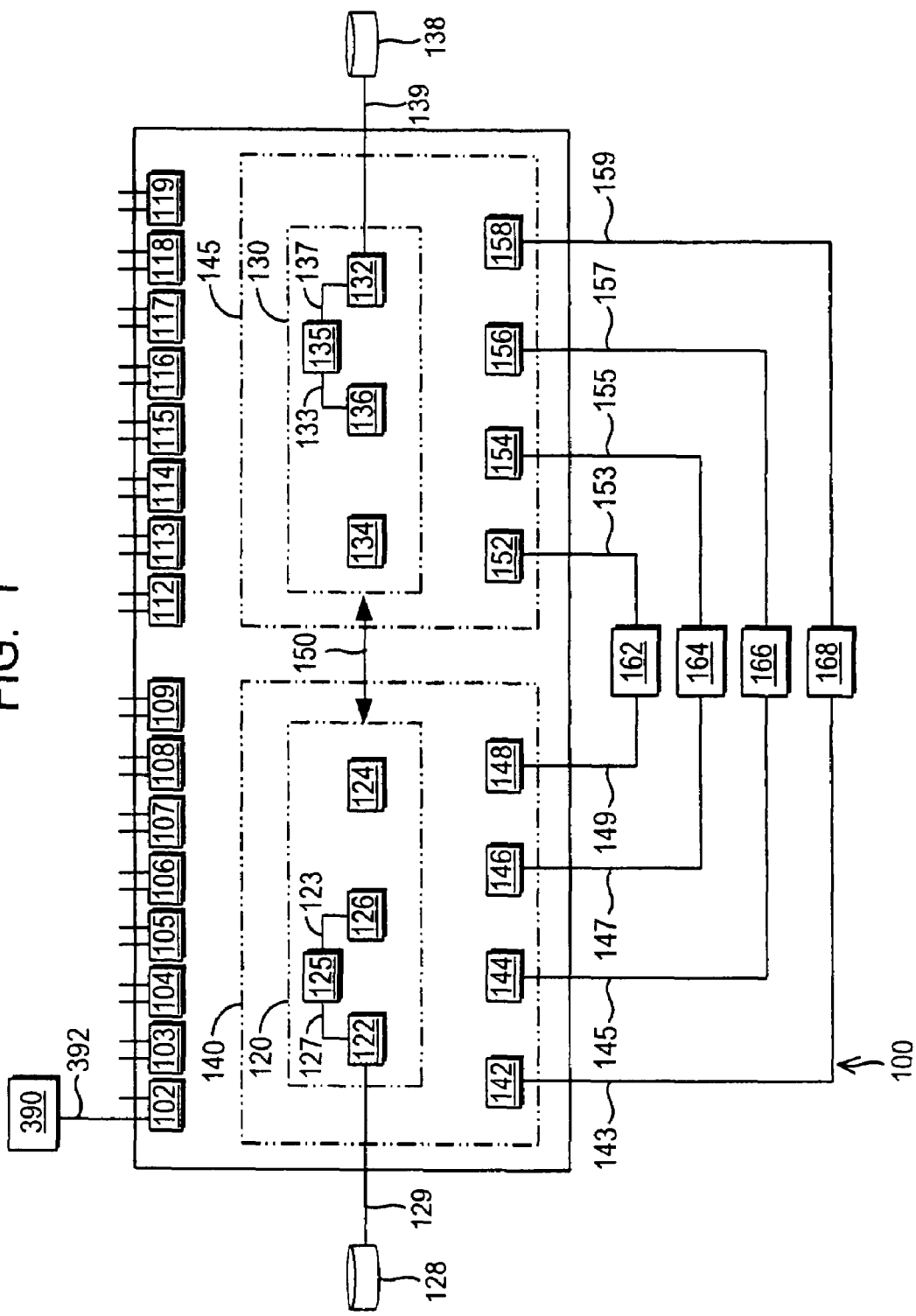
FIG. 1 is a block diagram showing the components of Applicants' data storage and retrieval system.

In the illustrated embodiment of FIG. 1, Applicants' information storage and retrieval system 100 includes first cluster 140 which includes a first processor complex 120, a second cluster 145 which includes a second processor complex 130, and a plurality of host adapters 102–109 and 112–119. Each host adapter may comprise one or more Fibre Channel ports, one or more FICON ports, one or more ESCON ports, or one or more SCSI ports. Each host adapter is connected to both processor cluster 120 and processor cluster 130 through one or more Common Platform Interconnect buses 150 such that each processor cluster can handle I/O from any host adapter.

In the illustrated embodiment of FIG. 1 system 100 includes sixteen host adapters. In other embodiments, system 100 includes fewer that sixteen host adapters. In other embodiments, system 100 includes more than sixteen host adapters.

Cluster processor complex 120 includes cache 122, non-volatile storage device ("NVS") 124, processor 126, and backup power source 125 which is interconnected with cache 122 by power conduit 127 and processor 126 by power conduit 123. In certain embodiments, NVS 124 comprises four separate memory cards. In certain embodiments, each pair of NVS cards has a battery-powered charging system that protects data even if power is lost on the entire system for up to 72 hours. In certain embodiments, backup power source 125 comprises one or more batteries.

Cache 122 is interconnected with information storage device 128 via communication link 129. In certain embodiments, communication link 129 is selected from a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, information storage device 128 comprises one or more optical storage media, one or more magnetic storage media, one or more electronic storage media, and combinations thereof. In certain embodiments, information storage device 128 is external to information storage and retrieval system 100. In certain embodiments, information storage device 128 is internal to information storage and retrieval system 100.

Cluster processor complex 130 includes cache 132, non-volatile storage device ("NVS") 134, processor 136, and backup power source 135 interconnected with cache 132 by power conduit 137 and processor 136 by power conduit 133. In certain embodiments, NVS 134 comprises four separate memory cards. In certain embodiments, each pair of NVS cards has a battery-powered charging system that protects data even if power is lost on the entire system for up to 72 hours. In certain embodiments, backup power source 135 comprises one or more batteries.

Cache 132 is interconnected with information storage device 138 via communication link 139. In certain embodiments, communication link 139 is selected from a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, information storage device 138 comprises one or more optical storage media, one or more magnetic storage media, one or more electronic storage media, and combinations thereof In certain embodiments, information storage device 138 is external to information storage and retrieval system 100. In certain embodiments, information storage device 138 is internal to information storage and retrieval system 100.

Information storage and retrieval system 100 further comprises a plurality of device adapters, such as device adapters 142, 144, 146, 148, 152, 154, 156, and 158, interconnected with a plurality of information storage media 162, 164, 166, and 168, via communication links 143, 145, 147, 149, 153, 155, 157, and 159, respectively. In certain embodiments, communication links 143, 145, 147, 149, 153, 155, 157, and 159, are each selected from a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the plurality of information storage media comprise one or more disk arrays. In certain embodiments, these one or more disk arrays comprise a plurality of magnetic disks, i.e. hard disks. In certain embodiments, the plurality of information storage media comprise a plurality of magnetic tapes.

The illustrated embodiment of FIG. 1 shows eight device adapters interconnected with, for example, four disk arrays. In other embodiments, Applicants' information storage and retrieval system includes more than eight device adapters. In other embodiments, Applicants' information storage and retrieval system includes fewer than eight device adapters.

In other embodiments, Applicants' information storage and retrieval system includes more than four disk arrays. In other embodiments, Applicants' information storage and retrieval system includes fewer than four disk arrays. Each array of disks appears to a host computer as one or more logical drives.

In certain embodiments, one or more of disk arrays 162, 164, 166, and/or 168, utilize a RAID protocol. In certain embodiments, one or more of disk arrays 162, 164, 166, and/or 168, comprise what is sometimes called a JBOD array, i.e. "Just a Bunch Of Disks" where the array is not configured according to RAID. As those skilled in the art will appreciate, a RAID (Redundant Array of Independent Disks) rank-comprises independent disk drives configured in an array of disk drives to obtain performance, capacity and reliability that exceeds that of a single large drive.

In the illustrated embodiment of FIG. 1, system 100 is interconnected with, and capable of communicating with, host computer 390. In other embodiments, Applicants' information storage and retrieval system 100 is capable of communicating with a plurality of host computers. In certain embodiments, Applicants' information storage and retrieval system 100 is capable of communicating with a plurality of host computers and one or more other information storage and retrieval systems.

Host computer 390 comprises a computer system, such as a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.)

Figure 2:
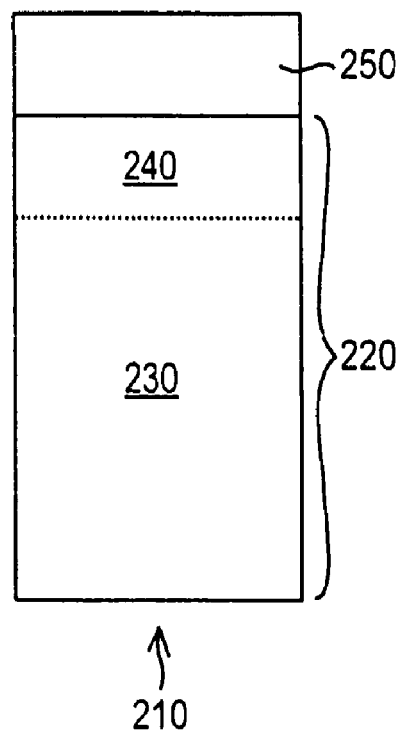
FIG. 2 is block diagram showing one embodiment of Applicants' integrated data cache, virtual NVS, NVS device.

In certain embodiments data cache 122 (FIG. 1) and NVS 124 (FIG. 1) comprise one device. Referring now to FIG. 2, device 210 includes data cache 220 and NVS 250. Data cache 220 further includes information storage portion 230 which is used as the data cache in normal operation. Information storage portion 240 comprises the storage space designated for use when using Applicants' method to rebuild a remote NVS image. In these embodiments, cache 122 and NVS 124 comprise device 210, where device 210 is interconnected to information storage device 128 via communication link 129 (FIG. 1). In certain embodiments, cache 132 and NVS 134 comprise device 210, where device 210 is interconnected to information storage device 138 via communication link 139 (FIG. 1).

NVS 124 and 134 are used to store a second copy of write data to ensure data integrity should there be a power failure of a cluster and the cache copy of that data is lost. NVS 124 stores write data provided to cluster 145. NVS 134 stores write data provided to cluster 140.

In the event of a failure of one cluster, the write data for the failed cluster will reside in the NVS disposed in the surviving cluster. This cached write data of the surviving cluster is then destaged at high priority to the disk arrays. At the same time, the surviving cluster will begin using the local NVS for its own write data thereby ensuring that two copies of write data are still maintained.

Using prior art methods, however, if both clusters fail, due to for example a system power loss, then the data residing in both non-volatile storage devices cannot be accessed by a processor in either cluster. Using Applicants' apparatus and method, however, if utility power to the system is lost both clusters are held active for a short period of time using back-up power sources. During this time, the processors quiesce write activity and prepare for power loss. During this time, each processor will attempt to pull the information from the appropriate remote NVS in its entirety to local memory.

Thereafter, both the local and remote NVS information is copied to the external fire hose dump disk, i.e. information storage devices 128 and 138, to be saved across the power loss. If the information storage and retrieval system was running dual cluster when the power was lost, then each cluster has a copy of the information written to both NVSs. In the event only one cluster is able to "IML," i.e. restart using an Initial Microcode Load ("IML") operation, then that operational cluster can process both the local and remote NVS images and go online with access to all logical subsystems with all data available.

Figure 3:
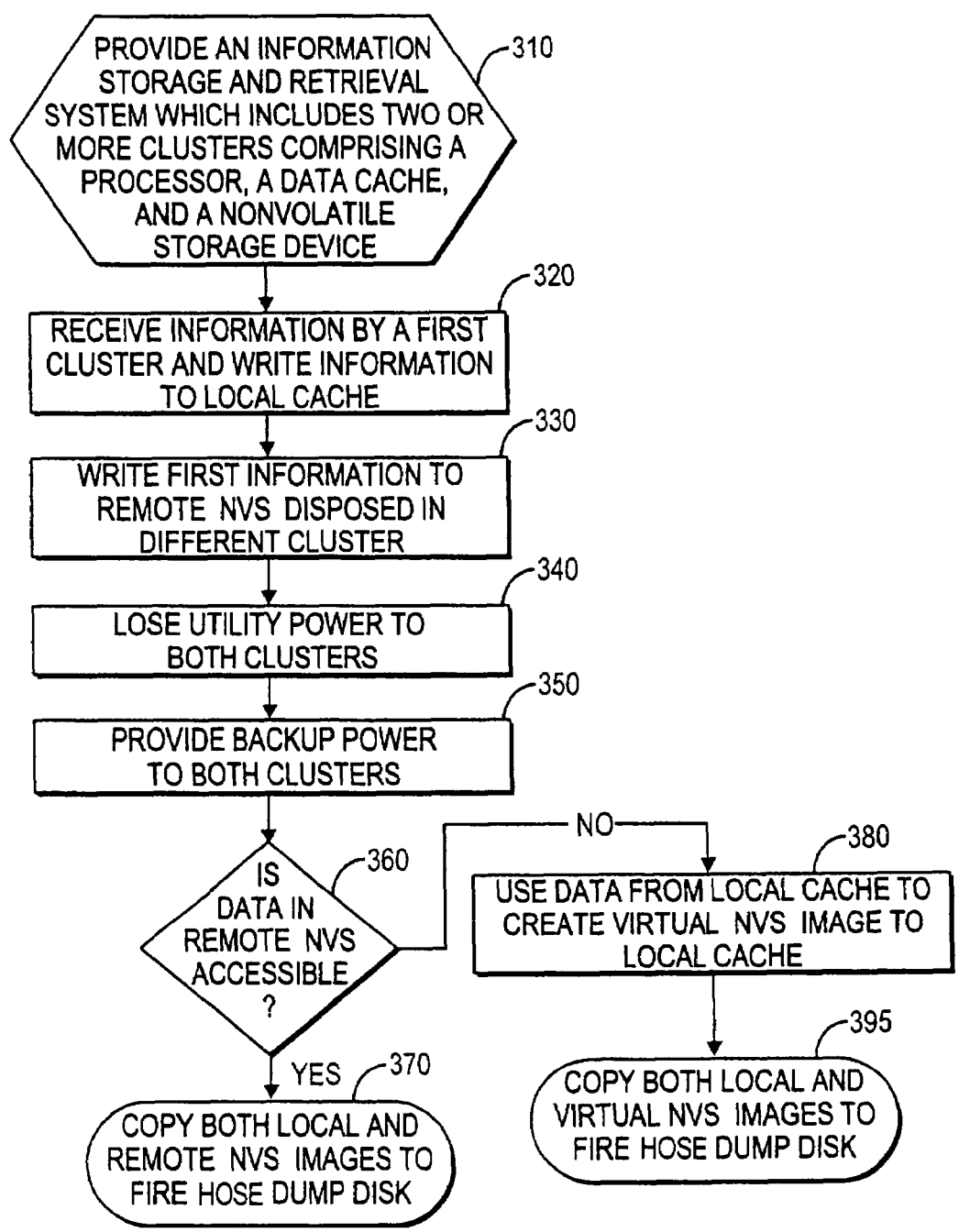
FIG. 3 is a flow chart summarizing the steps of Applicants' method.

FIG. 3 summarizes Applicants' method to rebuild a "remote" NVS image using "local" cache data. The steps of FIG. 3 are performed independently and essentially simultaneously by each cluster in Applicants' system 100.

Referring now to FIG. 3, in step 310 Applicants' method provides an information storage and retrieval system, such as for example system 100 (FIG. 1), comprising two or more clusters, such as for example clusters 140 (FIG. 1) and 145 (FIG. 1), where each cluster includes one or more data caches, such as for example data cache 122 (FIG. 1) disposed in cluster 140, one or more fire hose dump disks interconnected to that data cache, such as for example information storage medium 128 interconnected to data cache 122, one or more processors, such as for example processor 126 (FIG. 1) disposed in cluster 140, one or more non-volatile storage devices, such as for example NVS 124, and a backup power source, such as backup power source 125 (FIG. 1), interconnected with data cache 122 by power conduit 123 and processor 124 by power conduit 127.

In step 320, one cluster, such as cluster 140, of Applicants' information storage and retrieval system receives information and writes that information to local cache. In certain embodiments, that information is provided by one or more host computers, such as host computer 390 (FIG. 1). In step 330, Applicants' information storage and retrieval system writes the information received in step 320 to a non-volatile storage device disposed in a different cluster. For example, if cluster 140 received information from host 390, then processor 126 writes that information to NVS 134 (FIG. 1) disposed in cluster 145. In certain embodiments, steps 320 and 330 are performed substantially synchronously.

In step 340, both clusters of Applicants' information storage and retrieval system lose utility power. By "utility power," Applicants mean power continuously provided by a commercial and/or captive power generator generation facility external to Applicants' information storage and retrieval system.

In step 350, Applicants' information storage and retrieval system, such as system 100, provides backup power to the two processor complexes from a backup power sources disposed within system 100, such as for example power sources 125 and 135. In certain embodiments, step 350 is performed essentially synchronously with the loss of utility power in step 340.

In certain embodiments, power source 125 comprises one or more batteries. As those skilled in the art will appreciate, in these battery backup embodiments power source 125 can supply backup power for a limited time period. In certain embodiments, backup power source 125 provides power to first processor complex for up to about 4 minutes.

In step 360, the first cluster determines if the information written to the remote NVS is available. In certain embodiments, step 360 is performed by the first processor complex 120 (FIG. 1). In certain embodiments, step 360 is performed by the first processor, such as processor 126 (FIG. 1).

If Applicants' information storage and retrieval system determines in step 360 that the first cluster can access the information written to the remote NVS, then Applicants' method transitions from step 360 to step 370 wherein the method copies the NVS image from the remote NVS, such as NVS 134, and the local NVS image from the local NVS, such as NVS 124, to the fire hose dump disk interconnected with the first processor complex, i.e. fire hose dump disk 128 (FIG. 1).

On the other hand, if Applicants' information storage and retrieval system determines in step 360 that the first cluster cannot access the information written to the remote NVS, then Applicants' method transitions from step 360 to step 380 wherein the method creates a virtual NVS image using information disposed in the local cache, i.e. data cache 122 (FIG. 1). Applicants' method transitions from step 380 to step 395 wherein the method copies the virtual NVS image created in step 370, and the local NVS image, such as the NVS image from NVS 124, to the fire hose dump disk interconnected with the first processor complex, i.e. fire hose dump disk 128 (FIG. 1).

Figure 4:
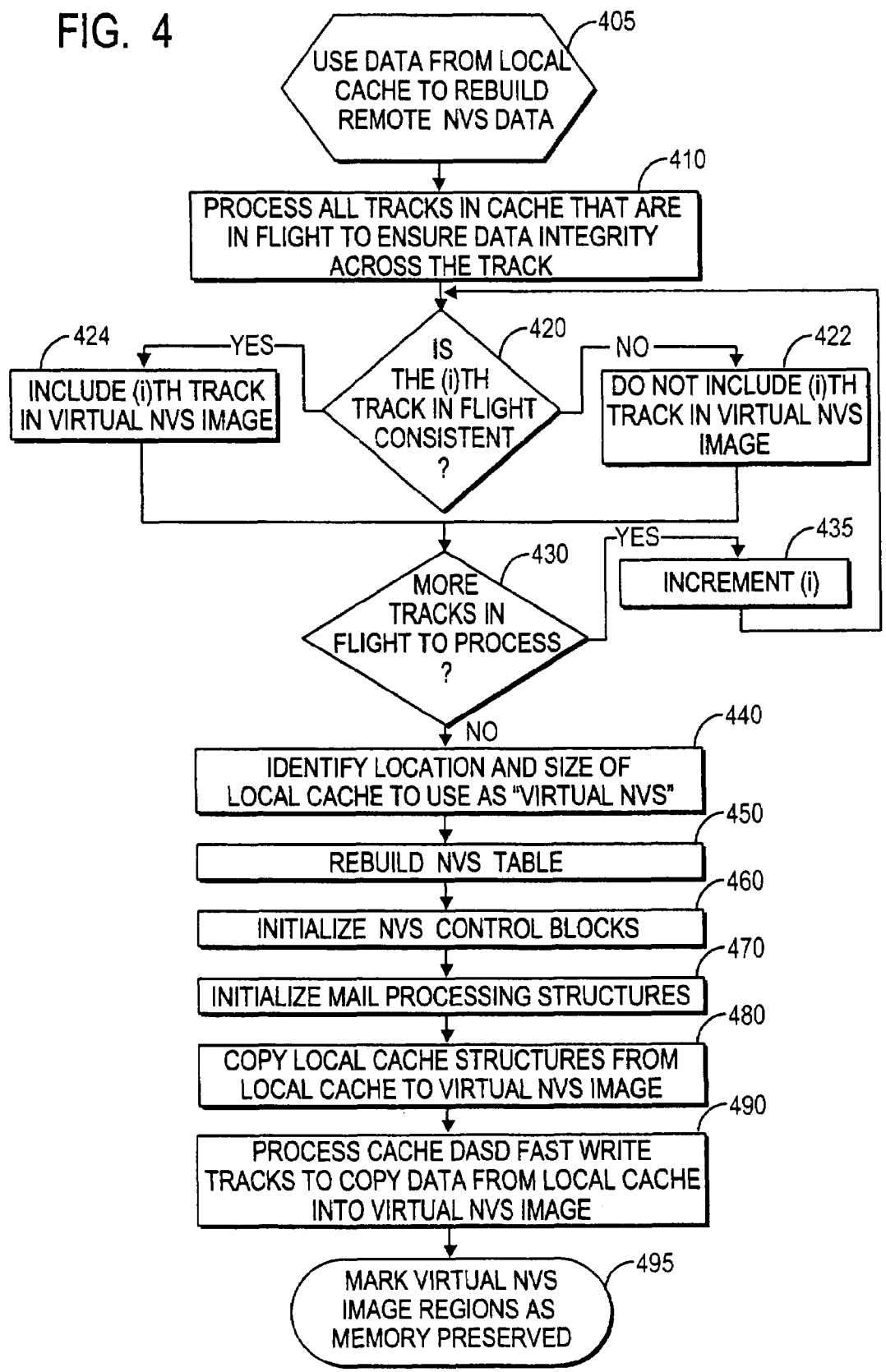
FIG. 4 is a flow chart summarizing certain additional steps of Applicants' method.

In certain embodiments of Applicants' method, step 380 (FIG. 3) includes one or more of the steps recited in FIG. 4. Referring now to FIG. 4, in step 410 each cluster in Applicants' information storage and retrieval system having lost utility power identifies all "tracks in flight." By "tracks in flight," Applicants mean tracks that were partially or completely written to the local cache, but where no WRITE COMPLETE signal was generated prior to loss of utility power. For example, in step 410 processor 126 (FIG. 1) disposed in first cluster 140 (FIG. 1) identifies tracks in flight written to data cache 122.

In step 420, Applicants' information storage and retrieval system selects the (i)th track in flight and determines if that (i)th track in flight is consistent. By "consistent," Applicants mean whether that track has been essentially completely written to the cache.

In certain embodiments, step 420 further includes determining, for the (i)th track in flight, if that track has a valid physical address in its record header. In certain embodiments wherein the (i)th track in flight comprises a fixed block track, step 420 further includes determining if that track has a valid sequence ID.

In certain embodiments of Applicants' method, write data is encoded by the host in accordance with an error checking algorithm, such as a longitudinal redundancy check algorithm (LRC), or a cyclic redundancy check algorithm (CRC), and the resultant check character is appended to the write data. The data, including the check character, is then checked by the information storage and retrieval system using the same error checking algorithm. If the data is error free, i.e. consistent, the remainder of the redundancy calculation is typically an all zero output. In certain embodiments of Applicants' method, data transfers, including write data transfers, are conducted in a variable number of fixed sized blocks of data, such as blocks of 512 bytes of data, and the check character is appended at the end of the data. In certain embodiments of Applicants' method, step 420 includes using one or more error checking algorithms to determine if the (i)th track in flight is consistent.

In certain embodiments, step 420 is performed by a processor disposed in Applicants' information storage and retrieval system. For example, in certain embodiments in step 420 processor 126 (FIG. 1) processes all tracks in flight written to data cache 122. Similarly, in step 420 processor 136 processes all tracks in flight written to data cache 132.

If Applicants' information storage and retrieval system determines in step 420 that the (i)th track in flight is consistent, then Applicants' method transitions from step 420 to step 424 wherein the method includes that (i)th track in flight in the virtual NVS image being formed. In certain embodiments, step 424 is performed by a processor disposed in Applicants' information storage and retrieval system. Applicants' method transitions from step 424 to step 430.

Alternatively, If Applicants' information storage and retrieval system determines in step 420 that the (i)th track in flight is not consistent, then Applicants' method transitions from step 420 to step 422 wherein the method does not include that (i)th track in flight in the virtual NVS image being formed. In certain embodiments, step 422 is performed by a processor disposed in Applicants' information storage and retrieval system, such as processor 126.

Applicants' method transitions from step 422 to step 430 wherein the method determines if the consistency of all the tracks in flight identified in step 410 have been determined. In certain embodiments, step 430 is performed by a processor disposed in Applicants' information storage and retrieval system, such as processor 126.

If Applicants' information storage and retrieval system determines in step 430 that the consistency of additional tracks in flight remain to be determined, then Applicants' method transitions from step 430 to step 435 wherein the method increments (i). The method transitions from step 435 to step 420 and continues. Alternatively, if Applicants' information storage and retrieval system determines in step 430 that the consistency of all tracks in flight has been determined, then Applicants' method transitions from step 430 to step 440 wherein the method identifies the location and size of the local cache portion that is to be used as a virtual NVS. For example and referring again to FIG. 2, in certain embodiments step 440 includes allocating portion 240 of data cache 220. In certain embodiments, step 440 is performed by a processor disposed in Applicants' information storage and retrieval system, such as processor 126.

Applicants' method transitions from step 440 to step 450 wherein the method rebuilds an NVS Table. NVS devices 124/134 each includes an NVS Table which identifies where various NVS structures can be found. These NVS structures include, for example, mail boxes, a track ID list, a copy services buffer, and NVS control blocks. Step 450 includes building an NVS Table in the virtual NVS portion, such as virtual NVS portion 240, of the local data cache, such as for example, local cache 220. In certain embodiments, step 450 is performed by a processor disposed in Applicants' information storage and retrieval system, such as processor 126.

Applicants' method transitions from step 450 to step 460 wherein the method initializes NVS control blocks. In certain embodiments, step 460 is performed by a processor disposed in Applicants' information storage and retrieval system, such as processor 126.

Applicants' method transitions from step 460 to step 470 wherein the method initializes mail processing structures. Such mail box structures communicate with host adapters, such as for example, adapter 102 (FIG. 1). For example, host computer 390 may provide a message to information storage and retrieval system 100 via a host adapter notifying the system that new data is being sent. When that new data has been written to both a data cache and an NVS, information storage and retrieval system 100, via a host adapter, sends a WRITE COMPLETE message back to host computer 390. Step 470 includes initializing mail buffers to receive new data. In certain embodiments, step 470 is performed by a processor disposed in Applicants' information storage and retrieval system, such as processor 126.

Applicants' method transitions from step 470 to step 480 wherein the method copies certain local cache structures to the virtual NVS created in step 440. Such local cache structures include, for example, a track ID list and a copy services buffer. In certain embodiments, step 480 is performed by a processor disposed in Applicants' information storage and retrieval system, such as processor 126.

Applicants' method transitions from step 480 to step 490 wherein the method scans through the local data cache to identify DASD Fast Write tracks. Such a DASD FAST Write track includes modified data in both the cache and NVS. Step 490 includes building NVS control blocks for these DASD Fast Write tracks. Step 490 further includes copying the cache image to the virtual NVS image being formed. In certain embodiments, step 490 is performed by a processor disposed in Applicants' information storage and retrieval system, such as processor 126.

Applicants' method transitions from step 490 to step 495 wherein the method marks the newly created virtual NVS image regions as memory preserved regions. In certain embodiments, step 495 is performed by a processor disposed in Applicants' information storage and retrieval system, such as processor 126.

In certain embodiments, Applicants' invention includes instructions residing in non-volatile memory 124 (FIG. 1) and 134 (FIG. 1), where those instructions are executed by processor 126 (FIG. 1) and 136 (FIG. 1), respectively, to performs steps 320, 330, 360, 370, and 380, recited in FIG. 3, and/or steps 410 through 495 recited in FIG. 4. In other embodiments, Applicants' invention includes instructions residing in any other computer program product, where those instructions are executed by a computer external to, or internal to, system 100, to perform steps 320, 330, 360, 370, and 380, recited in FIG. 3, and/or steps 410 through 495 recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to rebuild an NVS image using cache data, comprising the steps of:

providing an information storage and retrieval system capable of communicating with one or more host computers, wherein said information storage and retrieval system includes two or more clusters, wherein each of said two or more clusters comprises a processor, a device comprising a data cache and non-volatile storage, wherein said data cache comprises a first information storage portion used as a data cache in normal operation and a second information storage portion used to rebuild a remote NVS image, and a backup power source for said processor and said data cache;

providing two or more fire hose dump disks, wherein a different one of said two or more fire hose dump disks is interconnected to each of said two or more data caches;

receiving information by a first one of said two or more clusters, wherein said first cluster includes a first processor, a first data cache, a first non-volatile storage device, and a first backup power source;

writing said information to said first data cache and to a second non-volatile storage device disposed in a second cluster;

providing back-up power to said first processor and said first data cache upon cessation of the supply of utility power to said first cluster;

determining by said first controller if said information written to said second non-volatile storage device is accessible;

operative if said information written to said second non-volatile storage device is accessible by said first controller, copying the image of said second non-volatile storage device to the fire hose dump disk interconnected to said first data cache;

operative if said information written to said second non-volatile storage device is not accessible by said first controller;

creating a virtual NVS image using said information disposed in said first data cache; and copying said virtual NVS image to the fire hose dump disk interconnected to said first data cache.

2. The method of claim 1, further comprising the step of copying the image of said first non-volatile storage device to the fire hose dump disk interconnected to said first data cache.

3. The method of claim 1, wherein said creating step includes the step of ensuring data integrity across each track in flight written to said first data cache.

4. The method of claim 3, wherein said ensuring data integrity step comprises the steps of:
identifying tracks in flight written to said first data cache;
selecting a first one of said tracks in flight;
ascertaining if said first track in flight is consistent;
operative if said first track in flight is consistent, including said first track in flight in said virtual NVS image;
operative if said first track in flight is not consistent, not including said first track in flight in said virtual NVS image.

5. The method of step 4, wherein said ascertaining step includes determining if said first track in flight has a valid physical address.

6. The method of step 4, wherein said first track in flight comprises a fixed block track, and wherein said ascertaining step includes determining if said first track in flight comprises a valid sequence identifier.

7. The method of step 4, wherein said ascertaining step comprises the following steps:

providing an error checking algorithm;
generating by said host computer a check character for said first track in flight using said error checking algorithm;
providing said first track in flight and said check character to said information storage and retrieval system;
performing a consistency calculation by said first processor using said error checking algorithm;
determining using said consistency calculation if said first track in flight is consistent.

8. The method of claim 3, wherein said creating step further includes:
rebuilding an NVS table using said information written to said first cache;
wherein said NVS table includes the addresses for one or more mail boxes, a track ID list, zero or more copy services buffers, and one or more NVS control blocks.

9. The method of claim 8, wherein said creating step further includes initializing one or more NVS control blocks.

10. The method of claim 9, wherein said creating step further includes initializing mail processing structures to take on new data.

11. The method of claim 10, wherein said creating step further includes copying from said first data cache to said virtual NVS image a track id list and one or more copy services buffer.

12. The method of claim 11, wherein said creating step further comprises the steps of:
scanning through said first data cache to identify DASD Fast Write tracks;
building NVS control blocks for each identified DASD Fast Write track;
copying an image of said first data cache to said virtual NVS image; and
marking said virtual NVS image regions as memory preserved.

13. An article of manufacture comprising a computer useable medium having computer readable program code disposed therein to rebuild an NVS image using cache data, wherein said article of manufacture is capable of communicating with one or more host computers, wherein said article of manufacture includes two or more fire hose dump disks and two or more clusters, wherein each of said two or more clusters comprises a processor, a device comprising a data cache and non-volatile storage, wherein said data cache comprises a first information storage portion used as a data cache in normal operation and a second information storage portion used to rebuild a remote NVS image, and a backup power source for said processor and said data cache, and wherein a different one of said two or more fire hose dump disks is interconnected to each of said two or more data caches, the computer readable program code comprising a series of computer readable program steps to effect:

receiving information by a first one of said two or more clusters, wherein said first cluster includes a first processor, a first data cache, a first non-volatile storage device, and a first backup power source;

writing said information to said first data cache and to a second non-volatile storage device disposed in a second cluster;

providing back-up power to said first processor and said first data cache upon an interruption of the supply of utility power to said first cluster;

determining by said first controller if said information written to said second non-volatile storage device is accessible;

operative if said information written to said second non-volatile storage device is accessible by said first controller, copying the image of said second non-volatile storage device to the fire hose dump disk interconnected to said first data cache;

operative if said information written to said second non-volatile storage device is not accessible by said first controller;

creating a virtual NVS image using said information disposed in said first data cache; and copying said virtual NVS image to the fire hose dump disk interconnected to said first data cache.

14. The article of manufacture of claim 13, wherein said computer readable program code further comprises a series of computer readable program steps to effect copying said first NVS image to the fire hose dump disk interconnected to said first data cache.

15. The article of manufacture of claim 13, wherein said computer readable program code to create said virtual NVS image further comprises a series of computer readable program steps to effect ensuring data integrity across each track in flight written to said first data cache.

16. The article of manufacture of claim 15, wherein said computer readable program code to ensure data integrity further comprises a series of computer readable program steps to effect:
identifying tracks in flight written to said first data cache;
selecting a first one of said tracks in flight;
ascertaining if said first track in flight is consistent;
operative if said first track in flight is consistent, including said first track in flight in said virtual NVS image;
operative if said first track in flight is not consistent, not including said first track in flight in said virtual NVS image.

17. The article of manufacture of step 16, wherein said computer readable program code to ascertain if said first track in flight is consistent further comprises a series of computer readable program steps to effect determining if said first track in flight has a valid physical address.

18. The article of manufacture of step 16, wherein said computer readable program code to ascertain if said first track in flight is consistent further comprises a series of computer readable program steps to effect determining if said first track in flight comprises a valid sequence identifier.

19. The article of manufacture of step 16, wherein said computer readable program code to ascertain if said first track in flight is consistent further comprises a series of computer readable program steps to effect:
receiving from said host computer a check character for said first track in flight, wherein said check character is generated using an error checking algorithm;
retrieving said error checking algorithm;
performing a consistency calculation using said error checking algorithm and said check character;
determining using said consistency calculation if said first track in flight is consistent.

20. The article of manufacture of claim 15, wherein said computer readable program code to create said virtual NVS image further comprises a series of computer readable program steps to effect:
rebuilding an NVS table using said information written to said first cache;
wherein said NVS table includes the addresses for one or more mail boxes, a track ID list, zero or more copy services buffers, and one or more NVS control blocks.

21. The article of manufacture of claim 20, wherein said computer readable program code to create said virtual NVS image further comprises a series of computer readable program steps to effect initializing one or more NVS control blocks.

22. The article of manufacture of claim 21, wherein said computer readable program code to create said virtual NVS image further comprises a series of computer readable program steps to effect initializing mail processing structures to take on new data.

23. The article of manufacture of claim 22, wherein said computer readable program code to create said virtual NVS image further comprises a series of computer readable program steps to effect copying from said first data cache to said virtual NVS image a track id list and one or more copy services buffer.

24. The article of manufacture of claim 23, wherein said computer readable program code to create said virtual NVS image further comprises a series of computer readable program steps to effect:
scanning through said first data cache to identify DASD Fast Write tracks;
building NVS control blocks for each identified DASD Fast Write track;
copying an image of said first data cache to said virtual NVS image; and
marking said virtual NVS image regions as memory preserved.

25. A computer program product usable with a programmable computer processor having computer readable program code embodied therein to rebuild an NVS image using cache data disposed in an information storage and retrieval system, wherein said information storage and retrieval system is capable of communicating with one or more host computers, wherein said information storage and retrieval system includes two or more fire hose dump disks and two or more clusters, wherein each of said two or more clusters comprises a processor, a device comprising a data cache and non-volatile storage, wherein said data cache comprises a first information storage portion used as a data cache in normal operation and a second information storage portion used to rebuild a remote NVS image, and a backup power source for said processor and said data cache, and wherein a different one of said two or more fire hose dump disks is interconnected to each of said two or more data caches, comprising:
computer readable program code which causes said programmable computer processor to receive information by a first one of said two or more clusters, wherein said first cluster includes a first processor, a first data cache, a first non-volatile storage device, and a first backup power source;
computer readable program code which causes said programmable computer processor to write said information to said first data cache and to a second non-volatile storage device disposed in a second cluster;
computer readable program code which causes said programmable computer processor to provide back-up power to said first processor and said first data cache upon in interruption of the supply of utility power to said first cluster;
computer readable program code which causes said programmable computer processor to determine by said first controller if said information written to said second non-volatile storage device is accessible;
computer readable program code which, if said information written to said second non-volatile storage device is accessible by said first controller, causes said programmable computer processor to copy the image of said second non-volatile storage device to the fire hose dump disk interconnected to said first data cache;

computer readable program code which, if said information written to said second non-volatile storage device is not accessible by said first controller, causes said programmable computer processor to create a virtual NVS image using said information disposed in said first data cache, and copy said virtual NVS image to the fire hose dump disk interconnected to said first data cache.

26. The computer program product of claim 25, further comprising computer readable program code which causes said programmable computer processor to copy said first NVS image to the fire hose dump disk interconnected to said first data cache.

27. The computer program product of claim 25, wherein said computer readable program code which causes said programmable computer processor to create said virtual NVS image further comprises computer readable program code which causes said programmable computer processor to ensure data integrity across each track in flight written to said first data cache.

28. The computer program product of claim 27, wherein said computer readable program code which causes said programmable computer processor to ensure data integrity across each track in flight further comprises:
computer readable program code which causes said programmable computer processor to identify tracks in flight written to said first data cache;
computer readable program code which causes said programmable computer processor to select a first one of said tracks in flight;
computer readable program code which causes said programmable computer processor to ascertain if said first track in flight is consistent;
computer readable program code which, if said first track in flight is consistent, causes said programmable computer processor to include said first track in flight in said virtual NVS image;
computer readable program code which, if said first track in flight is not consistent, causes said programmable computer processor to not include said first track in flight in said virtual NVS image.

29. The computer program product of step 28, wherein said computer readable program code which causes said programmable computer processor to ascertain if said first track in flight is consistent further comprises computer readable program code which causes said programmable computer processor to determine if said first track in flight has a valid physical address.

30. The computer program product of step 28, wherein said computer readable program code which causes said programmable computer processor to ascertain if said first track in flight is consistent further comprises computer readable program code which causes said programmable computer processor to determine if said first track in flight comprises a valid sequence identifier.

31. The computer program product of step 28, wherein said computer readable program code which causes said programmable computer processor to ascertain if said first track in flight is consistent further comprises:
computer readable program code which causes said programmable computer processor to receive from said host computer a check character for said first track in flight, wherein said check character is generated using an error checking algorithm;
computer readable program code which causes said programmable computer processor to retrieve said error checking algorithm;
computer readable program code which causes said programmable computer processor to perform a consistency calculation using said error checking algorithm and said check character;
computer readable program code which causes said programmable computer processor to determine using said consistency calculation if said first track in flight is consistent.

32. The computer program product of claim 27, wherein said computer readable program code which causes said programmable computer processor to create said virtual NVS image further comprises:
computer readable program code which causes said programmable computer processor to rebuild an NVS table using said information written to said first cache;
wherein said NVS table includes the addresses for one or more mail boxes, a track ID list, zero or more copy services buffers, and one or more NVS control blocks.

33. The computer program product of claim 32, wherein said computer readable program code which causes said programmable computer processor to create said virtual NVS image further comprises computer readable program code which causes said programmable computer processor to initialize one or more NVS control blocks.

34. The computer program product of claim 33, wherein computer readable program code which causes said programmable computer processor to create said virtual NVS image further comprises computer readable program code which causes said programmable computer processor to initialize mail processing structures to take on new data.

35. The computer program product of claim 34, wherein computer readable program code which causes said programmable computer processor to create said virtual NVS image further comprises computer readable program code which causes said programmable computer processor to copy from said first data cache to said virtual NVS image a track id list and one or more copy services buffer.

36. The computer program product of claim 35, wherein said computer readable program code which causes said programmable computer processor to create said virtual NVS image further comprises:
computer readable program code which causes said programmable computer processor to scan through said first data cache to identify DASD Fast Write tracks;
computer readable program code which causes said programmable computer processor to build NVS control blocks for each identified DASD Fast Write track;
computer readable program code which causes said programmable computer processor to copy an image of said first data cache to said virtual NVS image; and
computer readable program code which causes said programmable computer processor to mark said virtual NVS image regions as memory preserved.

* * * * *